(12) United States Patent
Liu

(10) Patent No.: US 8,514,678 B2
(45) Date of Patent: *Aug. 20, 2013

(54) METHOD AND APPARATUS FOR DETECTING LAND PRE-PITS

(75) Inventor: Jingfeng Liu, Longmont, CO (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/426,773

(22) Filed: Mar. 22, 2012

(65) Prior Publication Data

US 2012/0176876 A1    Jul. 12, 2012

Related U.S. Application Data

(63) Continuation of application No. 12/249,248, filed on Oct. 10, 2008, now Pat. No. 8,164,993.

(60) Provisional application No. 60/980,000, filed on Oct. 15, 2007.

(51) Int. Cl.
*G11B 7/00* (2006.01)

(52) U.S. Cl.
USPC ............ 369/47.27; 369/53.2; 369/124.15

(58) Field of Classification Search
USPC ................ 369/47.27, 53.2, 124.15
See application file for complete search history.

(56) References Cited

U.S. PATENT DOCUMENTS

| 2002/0114249 A1 | 8/2002 | Kato et al. |
| 2005/0007928 A1 | 1/2005 | Iimura |
| 2005/0047318 A1 | 3/2005 | Sakata |
| 2005/0047759 A1 | 3/2005 | Sakata |
| 2005/0122884 A1 | 6/2005 | Hagiwara |
| 2005/0174913 A1 | 8/2005 | Shih et al. |
| 2007/0047400 A1 | 3/2007 | Haddad et al. |

FOREIGN PATENT DOCUMENTS

| JP | A-2003-123260 | 4/2003 |
| WO | WO 2004/090877 A1 | 10/2004 |

OTHER PUBLICATIONS

ECMA International, Standard ECMA-359, 80 mm (1,46 Gbytes preside) and 120 mm (4,70 Gbytes per side)DVD Recordable Disk (DVD-R), 1$^{st}$ Edition, Dec. 2004.

*Primary Examiner* — Latanya Bibbins

(57) ABSTRACT

Aspects of the disclosure provide a method for detecting land pre-pits. The method includes extracting a land pre-pit data stream from a signal responsive to land pre-pits on an optical medium based on a land pre-pit threshold, detecting a bit stream pattern from the land pre-pit data stream, comparing one or more bits in the land pre-pit data stream at locations relative to the bit stream pattern with pre-known bit information, and adjusting the land pre-pit threshold based on the comparison.

20 Claims, 10 Drawing Sheets

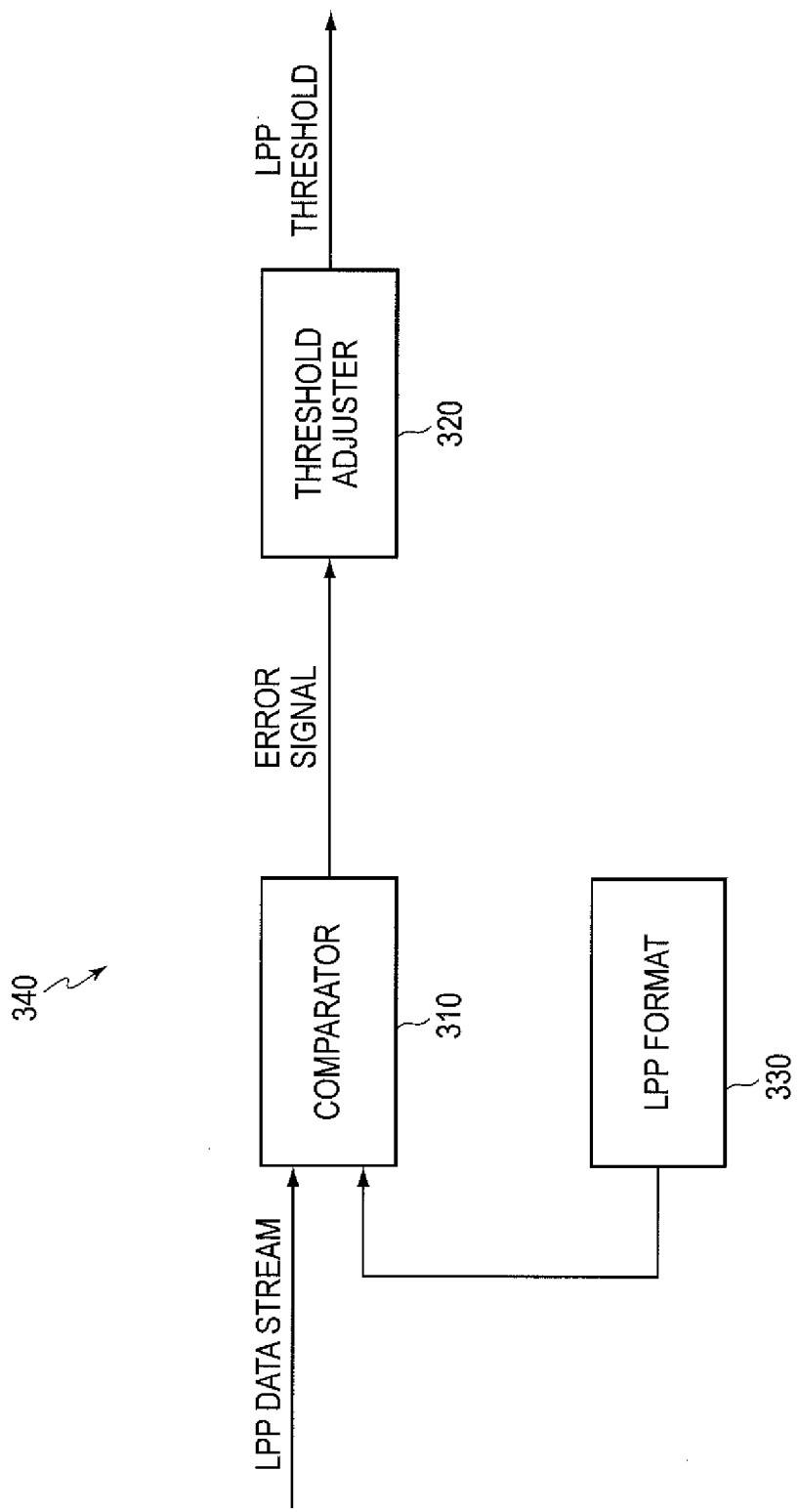

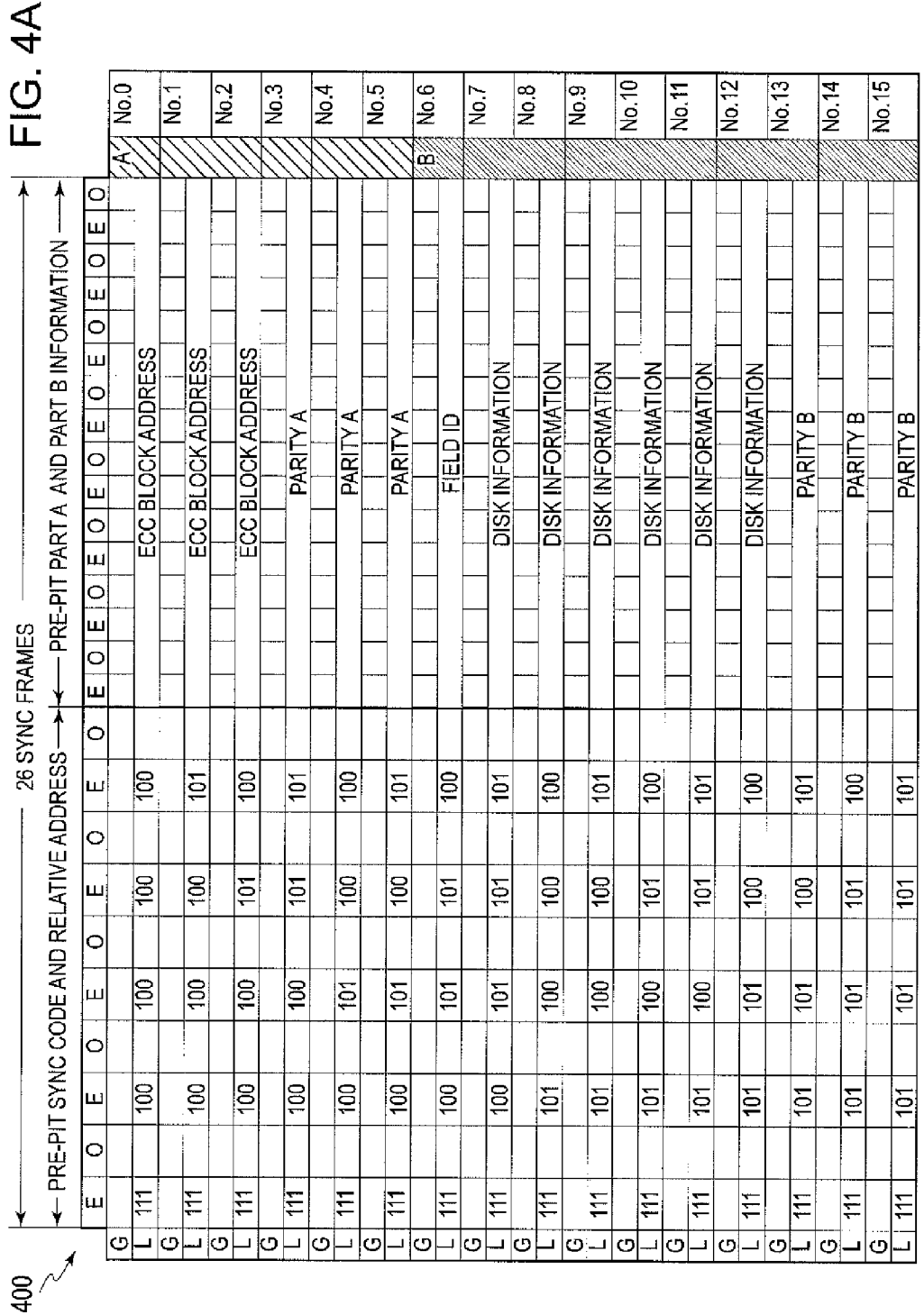

| | $b_2$ | $b_1$ | $b_0$ |
|---|---|---|---|
| PRE-PIT SYNC CODE IN EVEN POSITION | 1 | 1 | 1 |
| PRE-PIT SYNC CODE IN ODD POSITION | 1 | 1 | 0 |
| PRE-PIT DATA SET TO ONE | 1 | 0 | 1 |
| PRE-PIT DATA SET TO ZERO | 1 | 0 | 0 |

FIG. 4B

METHOD AND APPARATUS FOR DETECTING LAND PRE-PITS

INCORPORATION BY REFERENCE

This application is a continuation of U.S. patent application Ser. No. 12/249,248, "Method and Apparatus for Detecting Land Pre-Pits" filed Oct. 10, 2008, which claims the benefit of U.S. Provisional Application No. 60/980,000, "Land Pre-Pit Detector with Adaptive Threshold" filed on Oct. 15, 2007. The entire disclosures of the above-identified applications are incorporated herein by reference in their entirety.

BACKGROUND

Land pre-pits can be used to embed information, such as address information, disk information, for memory media, such as DVD-R, DVD-RAM, DVD-RW, and the like. For example, a memory medium may include a spiral groove with a spiral land. The spiral groove and the spiral land can be wobbled to incorporate timing information. Additionally, a memory medium, such as DVD-R, DVD-RAM and DVD-RW, may utilize land pre-pits, which can be in the form of little pieces of mirrors deposited at specific locations of the spiral land of the memory medium, to embed address information and disk information. The land pre-pits can be detected by a medium recording device to obtain the address information and the disk information of the memory medium. The address information and the disk information can assist the medium recording device to record user data at the specific address in the spiral groove of the memory medium.

SUMMARY

However, land pre-pits can be incorrectly detected by a medium recording device due to reasons, such as variations in manufacturing, noises and interferences of adjacent grooves, and the like. Aspects of the disclosure can provide a method for detecting land pre-pits. The method can adaptively adjust a threshold for detecting the land pre-pits in order to improve the correctness of detecting.

The method for detecting land pre-pits can include extracting a land pre-pit data stream from a reading signal based on a land pre-pit threshold, the reading signal corresponding to land pre-pits of an optical medium, comparing the land pre-pit data stream with format information of the optical medium to obtain an error signal, and adjusting the land pre-pit threshold based on the error signal.

Further, the method can include determining an initial land pre-pit threshold during a calibration process.

To compare the land pre-pit data stream with the format information, the method can further include detecting a SYNC frame from the land pre-pit data stream, and comparing the land pre-pit data stream and the format information with reference to the SYNC frame.

To extract the land pre-pit data stream, the method can further include comparing the reading signal with the land pre-pit threshold to determine a state, such as a binary state, of the reading signal.

Additionally, to adjust the land-pit threshold based on the error signal, the method can further include adjusting the land pre-pit threshold based on an average of the error signal. Further, the method can include averaging the error signal based on a programmable gain.

To average the error signal based on the programmable gain, the method can further include multiplying the error signal with the programmable gain, and accumulating the multiplied error signal.

To adjust the land pre-pit threshold, the method can further include adjusting a digital representation corresponding to the land pre-pit threshold based on the error signal, and converting the digital representation to an analog voltage of the land pre-pit threshold.

According to an aspect of the disclosure, the optical medium is at least one of DVD-R, DVD-RAM and DVD-RW.

Aspects of the disclosure can also provide an apparatus for detecting land pre-pits. The apparatus can include an extractor configured to extract a land pre-pit data stream from a reading signal based on a land pre-pit threshold, the reading signal corresponding to land pre-pits of an optical medium, and a controller configured to compare the land pre-pit data stream with format information of the optical medium to obtain an error signal, and adjust the land pre-pit threshold based on the error signal.

Furthermore, aspects of the disclosure can provide an optical drive. The optical drive can include an optical pickup unit configured to generate a reading signal corresponding to land pre-pits of an optical medium, and record data on the optical disc based on information extracted from the reading signal, an extractor configured to extract a land pre-pit data stream from the reading signal based on a land pre-pit threshold, and a controller configured to compare the land pre-pit data stream with format information of the optical medium to obtain an error signal, and adjust the land pre-pit threshold based on the error signal.

BRIEF DESCRIPTION OF THE DRAWINGS

Various exemplary embodiments of this disclosure will be described in detail with reference to the following figures, wherein like numerals reference like elements, and wherein:

FIG. 3 shows a block diagram of an exemplary land pre-pit loop controller;

FIGS. 4A and 4B show an exemplary land pre-pit data format;

DETAILED DESCRIPTION OF EMBODIMENTS

Figure 1A:
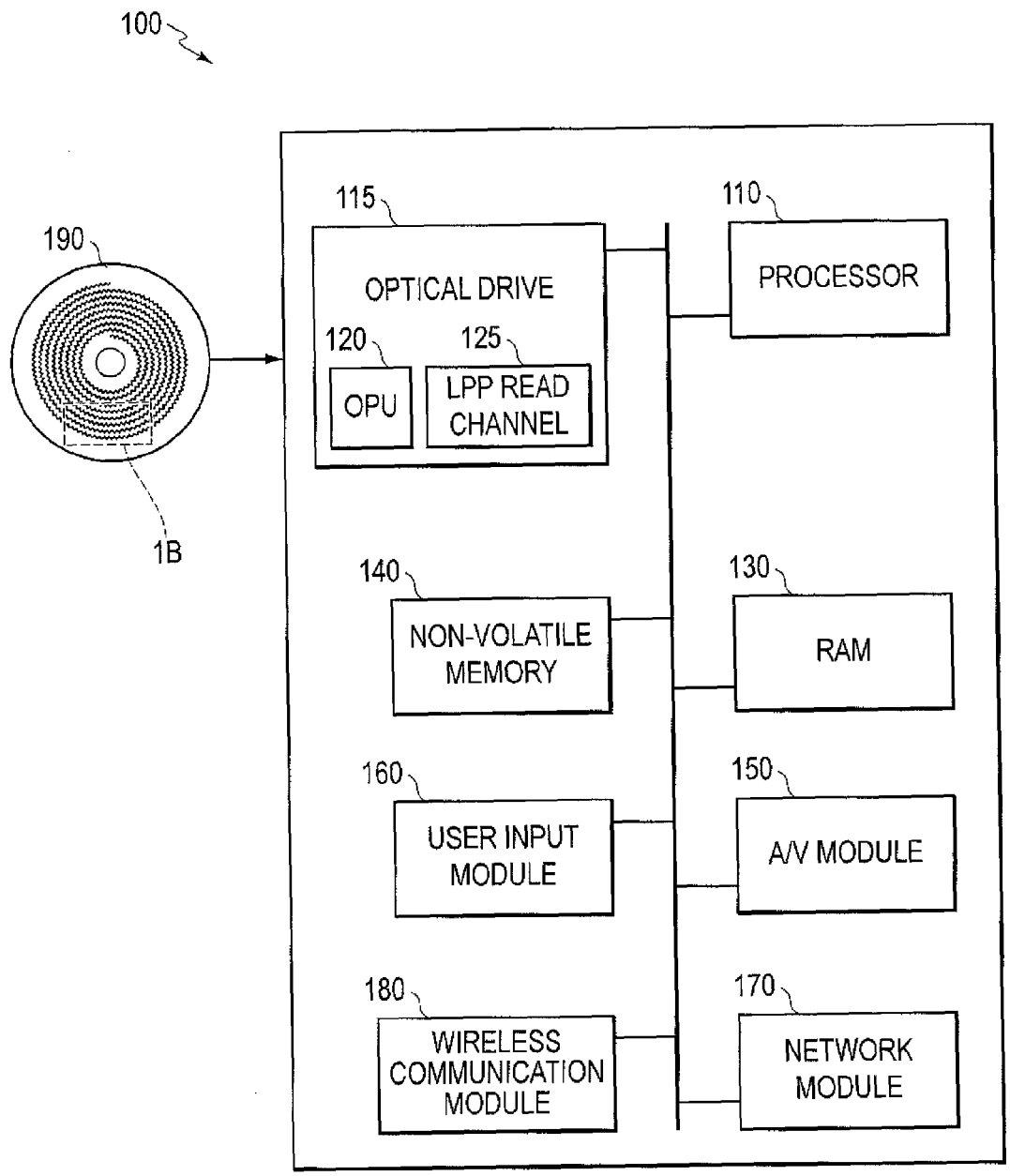
FIGS. 1A and 1B show a block diagram of an exemplary medium device and an exemplary memory medium.
Figure 1B:
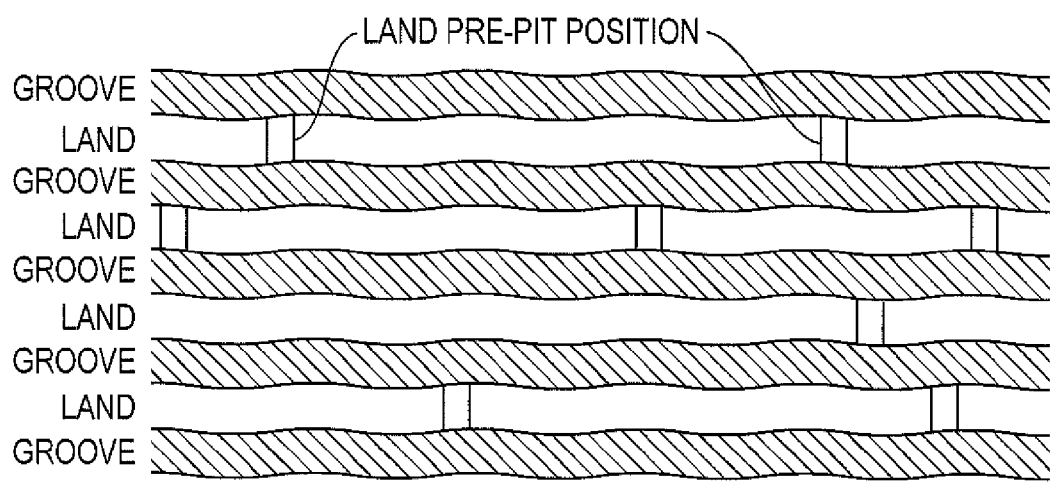

FIGS. 1A and 1B show a block diagram of an exemplary medium device with an exemplary memory medium. The medium device 100 can include a processor 110, an optical drive 115, a RAM unit 130, and a non-volatile memory 140. These elements can be coupled together as shown in FIG. 1A.

The optical drive 115 can further include an optical pickup unit (OPU) 120. The OPU 120 can receive signals corresponding to various information, such as timing information, address information, disc information, user data, and the like, in a memory medium, such as an optical disc 190. For example, the OPU 120 may direct a laser beam to a location of the optical disc 190. The laser beam can be reflected from the location of the optical disc 190. The reflected laser beam may have light properties that can correspond to information embedded at the location of the optical disc 190. The light properties can be detected by a light detector of the OPU 120. Further, the light detector of the OPU 120 may convert the light properties to electrical signals for other components of the optical drive 115 to extract the various information, for example.

In addition, the OPU 120 can be configured to record user data on the optical disc 190 according to the extracted information, such as timing information, address information, disc information, and the like. For example, the OPU 120 may direct a recording laser beam to a recording location of the optical disc 190. The recording laser beam may have a laser power determined according to the extracted disc information, and may have a turn-on time determined according to the extracted timing information. In addition, the recording location may be determined based on the extracted address information, for example.

According to the disclosure, the optical drive 115 may include a land pre-pit (LPP) read channel 125 that can be configured to detect land pre-pits from an electrical signal converted by the light detector in order to extract the embedded information. The land pre-pit read channel 125 can include an adaptive land pre-pit threshold. The adaptive land pre-pit threshold can be used to determine a status, such as a binary status, of the electrical signal to detect the land pre-pits.

As shown in FIG. 1A, the optical disc 190 can generally include a spiral recording track, for example in the form of a spiral groove adjacent to a spiral land. On the spiral recording track, user data can be stored on a recording layer by forming either data pits or data marks. The data pits or data marks can be preferred to have a substantially constant linear length to improve the data storage capability of the optical disc 190. To assist maintaining constant length of data marks or data pits, timing and address information can be encoded in the spiral groove and the spiral land during disc manufacturing. In an example, the timing information can be encoded by wobbling the spiral groove and the spiral land. Further, address information and disk information can be encoded via land pre-pits (LPP) for certain kinds of memory media, such as DVD-R, DVD-RAM and DVD-RW, and the like.

FIG. 1B shows an enlarged portion of an exemplary optical disc 190. The optical disc 190 can include alternatively arranged groove fields and land fields. The land fields can include land pre-pits. The land pre-pits can be produced by disc manufacturer. For example, during disc manufacturing, the disc manufacturer can deposit little pieces of mirrors, such as aluminum, at specific locations of the land fields to form the land pre-pits.

The mirrors may have a higher reflectivity than areas without the land pre-pits. The higher reflectivity can be detected by the OPU 120. For example, the OPU 120 may direct a laser beam onto a location of the optical disc 190. The laser beam can be reflected by the location. The reflected laser beam may have light properties that can correspond to a reflectivity of the location. When the laser beam is reflected by a location with a deposited mirror, the reflected laser beam may have a higher light intensity, for example. Further, the light properties may be detected by a detector of the OPU 120. The detector may generate electrical signals corresponding to the light properties. For example, the detector can generate a push-pull signal from the detected light. The push-pull signal may have an amplitude spike corresponding to a location with a mirror.

Further, the push-pull signal can be compared to a land pre-pit threshold to determine a status, such as a binary status, at a location. For example, when an amplitude of the electrical signal corresponding to a location is larger than the land pre-pit threshold, an amplitude spike can be detected. Therefore, the location can be determined to have a mirror. Thus, the location can be determined storing binary one, for example.

Generally, a land pre-pit threshold can be determined by a calibration process, and may be used globally to detect the land pre-pits. However, the globally used land pre-pit threshold can result in land pre-pit reading errors due to various reasons, such as manufacturing variations, gain variations and baseline variations of the electrical signal, noises and interferences of adjacent groove fields, and the like. Further, the land pre-pit reading errors may result in poor recording qualities.

According to the disclosure, the medium device 100 can include an adaptive land pre-pit threshold. The adaptive land pre-pit threshold can be adjusted based on format information of the land pre-pits. The adaptive land pre-pit can be used to reduce land pre-pit reading errors to improve recording quality.

The processor 110 of the medium device 100 can execute system and application codes. The non-volatile memory 140 can hold information even when power is off. Therefore, the non-volatile memory 140 can be used to store system and application codes, such as firmware. The RAM unit 130 is readable and writable. Generally, the RAM unit 130 can have a fast access speed. It can be preferred that data and codes are stored in the RAM unit 130 during operation, such that the processor 110 can access the RAM unit 130 for the codes and data instead of the non-volatile memory 140.

It should be understood that the memory device 100 may include more than one processor 110. Further, the non-volatile memory 140 may include various non-volatile memory devices, such as battery backup RAM, read only memory (ROM), programmable ROM (PROM), flash PROM, electrical erasable PROM (EEPROM) magnetic storage, optical storage, and the like. Some non-volatile memory 140 can be updated, such as various types of PROM. The RAM unit 130 may also include various RAM devices, such as DRAM, SRAM and the like.

For the ease and clarity of description, the embodiments are presented with a bus type architecture, however, it should be understood that any other architectures can also be used to couple components inside memory device 100.

Additionally, the memory device 100 may include a user input module 160. The user input module 160 may enable the user to control operations of the memory device 100. The user input module 160 may include various user input devices, such as keyboard, mouse, touch screen, and the like. In addition, the user input module 160 may include interfaces that can enable external user input devices.

In an embodiment, the memory device 100 may include an audio/video module 150. The audio/video module 150 may include various audio and video devices, such as microphone, display screen, and the like. In addition, the audio/video module 150 may include interfaces that can enable external audio and video devices. The audio/video module 150 can be utilized to play audio data/video data that can be stored in the optical disc 190.

In another embodiment, the memory device 100 may include a network module 170. Furthermore, the memory device 100 may include a wireless communication module 180. The network module 170 and the wireless communication module 180 may enable the memory device 100 to communicate the data stored in the optical disc 190 to other devices.

Figure 2A:
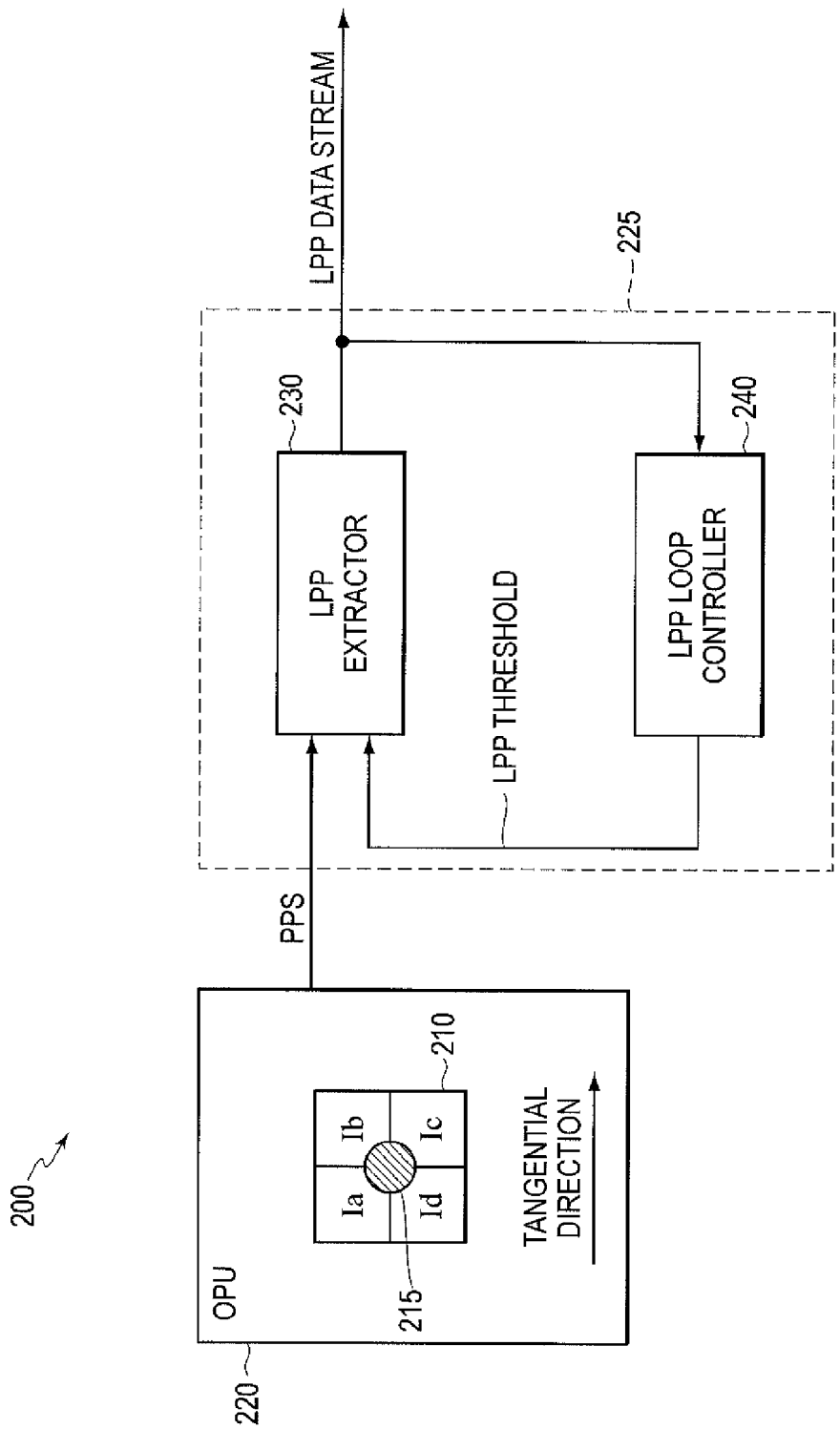
FIGS. 2A and 2B show a block diagram of an exemplary land pre-pit read channel coupled to an exemplary optical pick-up unit (OPU) and an exemplary pick-up signal.
Figure 2B:
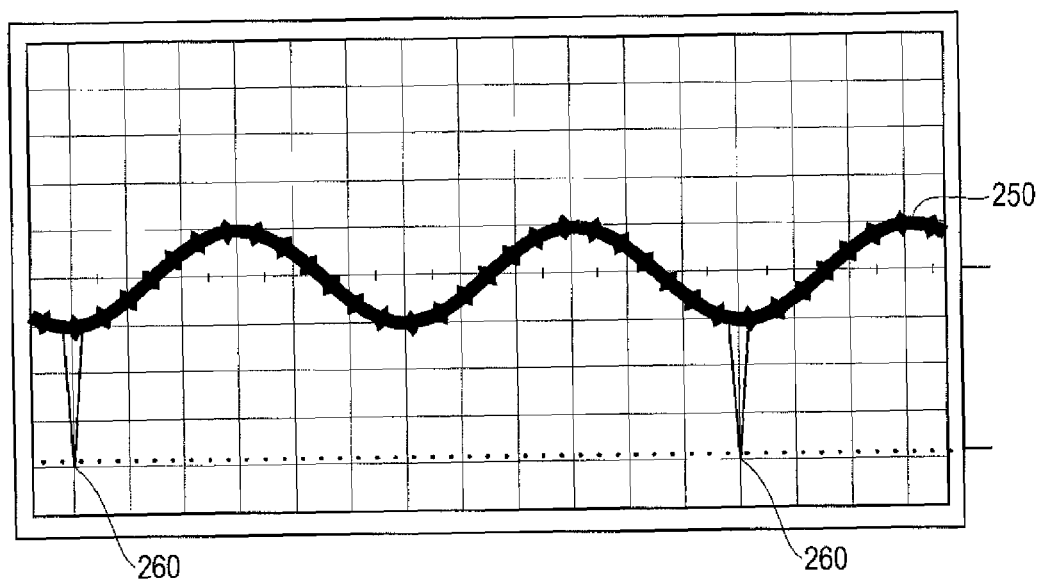

FIGS. 2A and 2B show a block diagram of an exemplary land pre-pit read channel receiving a push-pull signal and an exemplary waveform of a push-pull signal. FIG. 2A shows the block diagram of the exemplary land pre-pit read channel 225 coupled with an exemplary optical pickup unit 220. Further, the land pre-pit read channel 225 can include a land pre-pit extractor 230 and a land pre-pit loop controller 240. Theses elements can be coupled as shown in FIG. 2A.

The optical pickup unit 220 may include a detector, such as a quadrant photo detector 210 shown in FIG. 2A. The quadrant photo detector 210 may detect a light beam 215, and generate various signals, including a push-pull signal (PPS), corresponding to the light beam 215. The push-pull signal can correspond to wobbled groove and land fields on a memory medium. Further, the push-pull signal can correspond to land pre-pits in the land fields for certain memory medium, such as DVD-R, DVD-RAM and DVD-RW.

The land pre-pit extractor 230 can receive the push-pull signal. Further, the land pre-pit extractor 230 can compare the push-pull signal with an adaptive land pre-pit threshold to determine a land pre-pit data stream. In an embodiment, the land pre-pit extractor 230 may include an analog comparator (not shown). The analog comparator may compare the push-pull signal with the adaptive land pre-pit threshold to obtain a pulse signal. Further, the pulse signal can be converted to the land pre-pit data stream based on a clock signal, such as a wobble clock signal that can also be extracted from the push-pull signal.

The land pre-pit loop controller 240 can receive the extracted land pre-pit data stream and adjust the adaptive land pre-pit threshold based on the extracted land pre-pit data stream. Further, the adjusted adaptive land pre-pit threshold can be used by the land pre-pit extractor 230 to extract a subsequent land pre-pit data stream from a following portion of the push-pull signal. In such a way, the land pre-pit loop controller 240 can couple the land pre-pit extractor 230 to form a land pre-pit feedback loop.

According to the disclosure, land pre-pits are formed by disc manufacture according to a pre-known format, such as an industry standard. Therefore, the land pre-pit loop controller 240 may include the pre-known format information about the land pre-pits. The land pre-pit loop controller 240 may extract detected format from the land pre-pit data stream. Further, the land pre-pit loop controller 240 can compare the detected format with the pre-known format information, and adjust the adaptive land pre-pit threshold accordingly.

FIG. 2B shows an exemplary waveform of a push-pull signal. The push-pull signal 250 can have a sinusoid shape as a result of wobbled groove and land fields. Further, the push-pull signal 250 may include spikes 260 as a result of land pre-pits at specific locations of land fields. Due to various variations, noises and interferences, amplitudes of the spikes 260 may vary. Further, the amplitude variations of the spike 260 may result in detecting errors in the land pre-pit data stream.

FIG. 3 shows a block diagram of an exemplary land pre-pit loop controller according to disclosure. The land pre-pit loop controller 340 may include a comparator 310, a threshold adjuster 320 and a land pre-pit format retainer 330 holding pre-known land pre-pit format information. These elements can be coupled together as shown in FIG. 3.

The comparator 310 can receive a land pre-pit data stream and compare the land pre-pit data stream with the pre-known land pre-pit format information. Then, the comparator 310 can output an error signal corresponding to difference between the land pre-pit data stream and the pre-known land pre-pit format information. In an embodiment, the comparator 310 can be implemented as a software code module, which can be executed by a processor (not shown) to compare the land pre-pit data stream with the pre-known land pre-pit format information. In another embodiment, the comparator 310 can be implemented as a hardware module, such as application specific integrated circuit (ASIC), to perform the above functions.

The threshold adjuster 320 can receive the error signal and adjust the adaptive land pre-pit threshold based on the error signal. In an embodiment, the threshold adjuster 320 may adjust the adaptive land pre-pit threshold based on an average of the error signal. Additionally, the threshold adjuster 320 may include a programmable parameter, such as a programmable gain, which can be used to change properties of the land pre-pit feedback loop.

The land pre-pit format retainer 330 can include pre-known land pre-pit format information. In an embodiment, the land pre-pit format retainer 330 can be implemented in software codes that can be stored in a memory medium, such as the random access memory (RAM) 130, the non-volatile memory 140, and the like, to hold the pre-known land pre-pit format information. In another embodiment, the land pre-pit format retainer 330 can include memory devices, such as registers, to hold the pre-known land pre-pit format information.

FIGS. 4A and 4B show tables of exemplary land pre-pit format information. FIG. 4A shows an exemplary pre-pit physical block format information according to a standard. The pre-pit physical block 400 can be encoded in the land fields, and can correspond to 16 sectors of data blocks, which are generally referred as ECC blocks, in the groove fields.

The pre-pit physical block 400 can include 16 sets pre-pits No. 0-No. 15. Each set of pre-pits can include 26 SYNC frames, which are assigned even (E) SYNC frames or odd (O) SYNC frames according to their sequences. Each SYNC frame may include 8 wobble periods, and each wobble period can be encoded a binary wobble bit depending on whether the wobble period includes a pre-pit. For example, a wobble period can be encoded with a binary wobble bit one if the wobble period includes a pre-pit, otherwise the wobble period can be encoded with a binary wobble bit zero.

The wobble bits can be used to encode address information and disc information according to certain format. In the example of FIG. 4A, every two SYNC frames can use the wobble bits to encode a code. The code can be encoded at either the even SYNC frame or at the odd SYNC frame. Further, the code can be a SYNC code or a binary bit code according to certain coding format.

FIG. 4B shows an exemplary coding format according to a standard. The coding format can use three wobble binary bits $b_2$-$b_0$ to encode the SYNC code and the binary bit code in every two SYNC frames. In the example of FIG. 4B, when the SYNC code is in even SYNC frame, the three wobble binary bits $b_2$-$b_0$ are 111; when the SYNC code is in odd SYNC frame, the three wobble binary bits $b_2$-$b_0$ are 110; when binary one is encoded, the three wobble binary bits $b_2$-$b_0$ are 101; and when binary zero is encoded, the three wobble binary bits $b_2$-$b_o$ are 100.

Accordingly, wobble bits information can be pre-known at certain locations. For example, two SYNC frames that encode a SYNC code can either be 1110000000000000 or 0000000011000000. In an embodiment, a comparator can generate an error signal based on the two SYNC frames that encode a SYNC code. The comparator may store detected wobble bits of two SYNC frames corresponding to a SYNC code in registers, which can be referred as rawLPP[0:15]. Further, the comparator can generate the error signal by comparing the detected wobble bits with the pre-known format information. For example, the comparator may assign −1 to the error signal when 0 is detected at a location that should be 1 according to the pre-known format, and may assign 1 to error signal when 1 is detected at a location that should be 0 according to the pre-known format.

In an embodiment, a comparator can be configured to generate an error signal according to following pseudo codes:

```
if rawLPP[0]|rawLPP[8]~=1
    error signal <=−1
end
if rawLPP[1] | rawLPP[9] | rawLPP[3:7] | rawLPP[11:15] ~=0
    error signal <=+1
end
```

According to the disclosure, the error signal can be used by the threshold adjuster 320 to adjust the adaptive pre-pit threshold to improve the pre-pit detecting correctness. In an embodiment, the threshold adjuster 320 can adjust the adaptive pre-pit threshold based on an average of the error signal.

Figure 5:
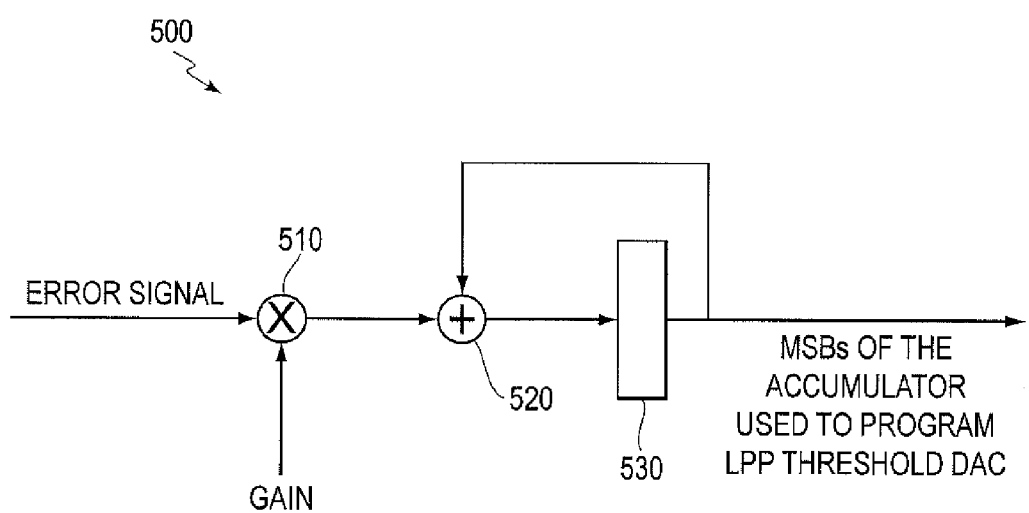
FIG. 5 shows a block diagram of an exemplary threshold adjuster.

FIG. 5 shows a block diagram of an exemplary integrator circuit that can be included in a threshold adjuster to generate a control signal based on an error signal. The integrator 500 can include a multiplier 510, an accumulator 520, and a register 530. These elements can be coupled as shown in FIG. 5.

The multiplier 510 can receive an error signal, and multiply the error signal with a programmable gain. The programmable gain can be used to adjust properties of the land pre-pit feedback loop.

The accumulator 520 and the register 530 can be coupled together to integrate the multiplied error signal to generate an integrated error signal. Further, the integrated error signal can be used to adjust the adaptive land pre-pit threshold.

In an embodiment, a most significant bit of the integrated error signal can be used to adjust a digital representation of the adaptive land pre-pit threshold. Further, the digital representation of the adaptive land pre-pit can be converted to an analog voltage signal by a digital to analog converter (DAC).

Figures 6A, 6B, 6C:
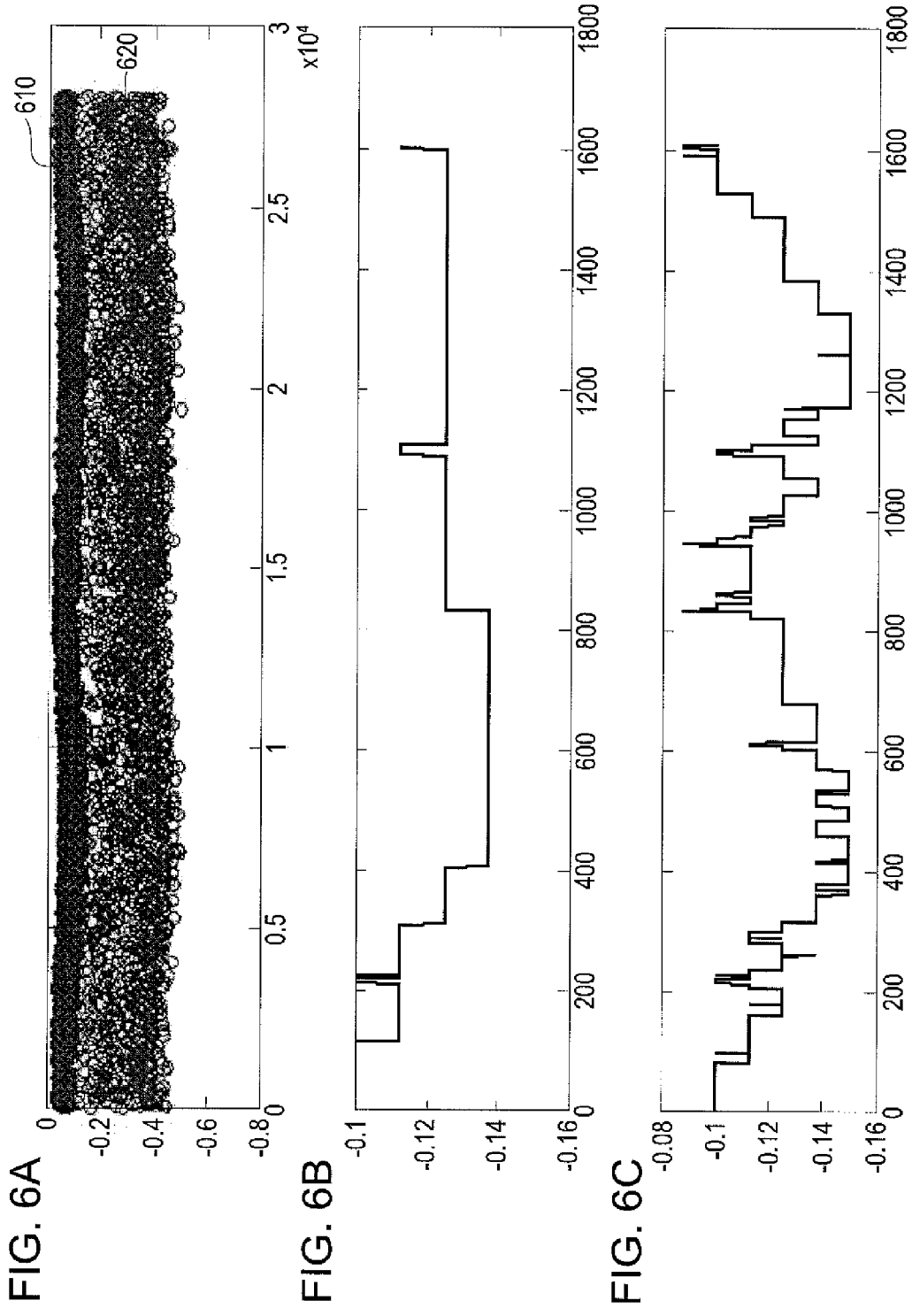
FIGS. 6A-6C show waveforms of an exemplary land pre-pit read channel.

FIGS. 6A-6C show waveforms of an exemplary land pre-pit detector. FIG. 6A shows waveforms of an exemplary push-pull signal read from an optical medium. The waveforms can include two portions, a wobble baseline portion 610 and a spike portion 620. The spike portion can correspond to amplitude spikes that area result from land pre-pits. However, as can be seen, the wobble based line portion 610 and the spike portion 620 may not distinguishable by a single global threshold.

FIG. 6B and FIG. 6C show waveforms of exemplary adaptive land pre-pit threshold according to two feedback loop settings, respectively. In an embodiment, the two feedback loop settings can correspond to different values of a programmable gain of a feedback loop. For example, FIG. 6B can correspond to a feedback loop setting having a larger programmable gain, and FIG. 6C can correspond to a feedback loop setting having a smaller programmable gain. Accordingly, the adaptive land pre-pit threshold may have different properties. For example, the adaptive land pre-pit threshold waveform in FIG. 6B can have a smaller bandwidth, while the adaptive land pre-pit threshold waveform in FIG. 6C can have a larger bandwidth.

Figure 7:
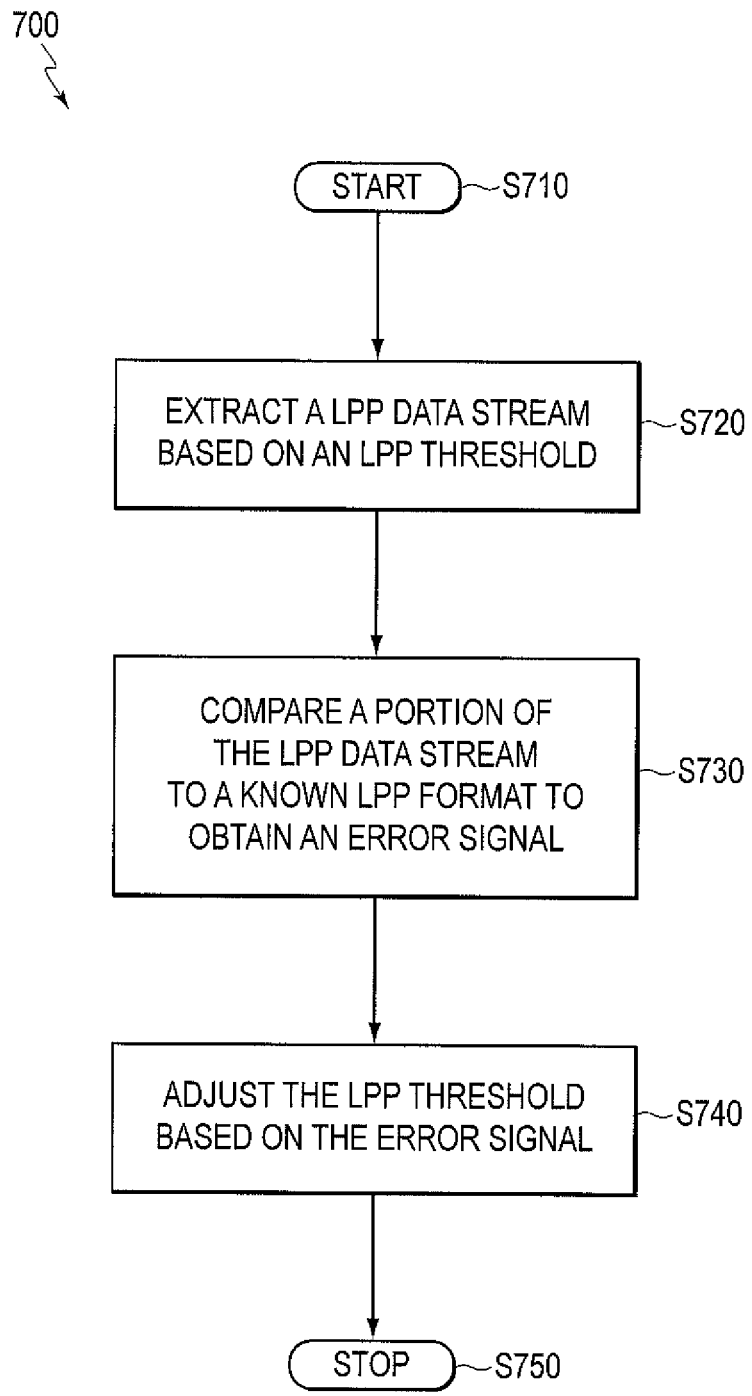
FIG. 7 shows a flowchart outlining an exemplary process for detecting land pre-pits.

FIG. 7 shows a flowchart outlining an exemplary process for detecting land pre-pit. The process starts at step S710 and proceeds to step S720. In step S720, a land pre-pit read channel, such as the land pre-pit read channel 225, may receive a push-pull signal. Further, the land pre-pit read channel may extract a land pre-pit data stream based on an adaptive pre-pit threshold. In an embodiment, the adaptive pre-pit threshold can be determined initially by a calibration process that calibrates parameters for a memory medium. The initial adaptive pre-pit threshold can be one that is good for a portion of the memory medium. In another embodiment, the initial adaptive pre-pit threshold can be a good nominal threshold that can be pre-programmed in the memory medium. Then, the process proceeds to step S730.

In step S730, a controller, such as the land pre-pit loop controller 240, may compare a portion of the land pre-pit data stream with a pre-known format to obtain an error signal. In an embodiment, the controller may first detect a SYNC code. Once the SYNC code has been detected and verified, the controller can compare the land pre-pit stream with the known format accordingly. For example, SYNC codes can appear every 26 SYNC frames according to a standard. Further, each SYNC code can have a format of 1110000000000000 or a format of 0000000001100000. In an embodiment, the controller may generate −1 for missing a pre-pit at a location, and generate +1 for an unexpected pre-pit at a location. Then the process proceeds to step S740.

In step S740, the controller may adjust the adaptive land pre-pit threshold based on the error signal. In an example, the controller may adjust the adaptive land pre-pit threshold based on an average of the error signal. Then, the adjusted adaptive land pre-pit threshold can be used to extract land pre-pits from coming push-pull signal. The process then proceeds to step S750 and terminates.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A method for detecting land pre-pits, comprising:
   extracting a land pre-pit data stream from a signal responsive to land pre-pits on an optical medium based on a land pre-pit threshold;
   detecting a bit stream pattern from the land pre-pit data stream;
   comparing one or more bits in the land pre-pit data stream at locations relative to the bit stream pattern with pre-known bit information; and
   adjusting the land pre-pit threshold based on the comparison.

2. The method according to claim 1, further comprising:
   determining an initial land pre-pit threshold during a calibration process.

3. The method according to claim 1, wherein adjusting the land pre-pit threshold based on the comparison further comprises:
   generating an error signal based on the comparison; and
   adjusting the land pre-pit threshold based on the error signal.

4. The method according to claim 3, wherein adjusting the land pre-pit threshold based on the error signal further comprises:

adjusting the land pre-pit threshold based on an average of the error signal.

5. The method according to claim 4, further comprising: averaging the error signal based on a programmable gain.

6. The method according to claim 5, wherein averaging the error signal based on the programmable gain, further comprising:
   multiplying the error signal with the programmable gain; and
   accumulating the multiplied error signal.

7. The method according to claim 1, wherein adjusting the land pre-pit threshold based on the comparison further comprising:
   adjusting a digital representation corresponding to the land pre-pit threshold; and
   converting the digital representation to an analog voltage of the land pre-pit threshold.

8. The method according to claim 1, wherein the optical medium is at least one of DVD-R, DVD-RAM and DVD-RW.

9. An apparatus, comprising:
   an extractor configured to extract a land pre-pit data stream from a signal responsive to land pre-pits on an optical medium based on a land pre-pit threshold; and
   a controller configured to detect a bit stream pattern from the land pre-pit data stream, compare one or more bits in the land pre-pit data stream at locations relative to the bit stream pattern with pre-known bit information, adjust the land pre-pit threshold based on the comparison.

10. The apparatus according to claim 9, wherein the controller is further configured to determine an initial land pre-pit threshold during a calibration process.

11. The apparatus according to claim 9, wherein the controller further comprises:
    a memory device configured to store the pre-known bit information.

12. The apparatus according to claim 9, wherein the controller is further configured to generate an error signal based on the comparison, and adjust the land pre-pit threshold based on the error signal.

13. The apparatus according to claim 12, wherein the controller is configured to adjust the land pre-pit threshold based on an average of the error signal.

14. The apparatus according to claim 12, wherein the controller further comprises:
    a multiplier configured to multiply the error signal with a programmable gain; and
    an accumulator configured to accumulate the multiplied error signal.

15. The apparatus according to claim 9, wherein the controller further comprises:
    a memory device configured to store a digital representation corresponding to the land pre-pit threshold; and
    a digital to analog converter (DAC) configured to convert the digital representation to an analog voltage of the land pre-pit threshold.

16. An optical drive, comprising:
    an optical pickup unit configured to generate a signal in response to a track on an optical medium;
    an extractor configured to extract a land pre-pit data stream from the signal based on a land pre-pit threshold; and
    a controller configured to detect a bit stream pattern from the land pre-pit data stream, comparing one or more bits in the land pre-pit data stream at locations relative to the bit stream pattern with pre-known bit information, adjusting the land pre-pit threshold based on the comparison.

17. The optical drive according to claim 16, wherein the controller further comprises:
    a memory device configured to store the pre-known bit information.

18. The optical drive according to claim 16, wherein the controller is further configured to generate an error signal based on the comparison, and adjust the land pre-pit threshold based on the error signal.

19. The optical drive according to claim 18, wherein the controller further comprises:
    a multiplier configured to multiply the error signal with a programmable gain; and
    an accumulator configured to accumulate the multiplied error signal, and
    the controller is configured to adjust the land pre-pit threshold based on the accumulated error signal.

20. The optical drive according to claim 16, wherein the controller further comprises:
    a memory device configured to store a digital representation corresponding to the land pre-pit threshold; and
    a digital to analog converter (DAC) configured to convert the digital representation to an analog voltage of the land pre-pit threshold.

* * * * *